US008345673B1

United States Patent
Lo et al.

(10) Patent No.: US 8,345,673 B1
(45) Date of Patent: Jan. 1, 2013

(54) PHYSICAL-LAYER DEVICE (PHY) HAVING A SERIAL INTERFACE AND A MAGIC PACKET CIRCUIT

(75) Inventors: William Lo, Cupertino, CA (US); Ozdal Barkan, Mountain View, CA (US)

(73) Assignee: Marvell International, Ltd., Hamilton (BM)

( * ) Notice: Subject to any disclaimer, the term of this patent is extended or adjusted under 35 U.S.C. 154(b) by 348 days.

(21) Appl. No.: 11/971,612

(22) Filed: Jan. 9, 2008

Related U.S. Application Data

(60) Provisional application No. 60/886,386, filed on Jan. 24, 2007.

(51) Int. Cl.
*H04L 12/50* (2006.01)
*H04L 12/28* (2006.01)
*H04L 12/66* (2006.01)
*H04Q 11/00* (2006.01)
*H04J 3/16* (2006.01)
*G06F 15/173* (2006.01)
*G06F 1/00* (2006.01)
*G06F 15/16* (2006.01)

(52) U.S. Cl. ........ 370/366; 370/410; 370/463; 370/469; 709/224; 709/250; 713/310; 713/323; 713/324

(58) Field of Classification Search .................. 370/419, 370/362–366, 400–410, 469; 713/100, 310, 713/320, 300, 323, 324; 709/217–219, 224
See application file for complete search history.

(56) References Cited

U.S. PATENT DOCUMENTS

| 5,404,544 A * | 4/1995 | Crayford ...................... 713/310 |
| 5,938,771 A * | 8/1999 | Williams et al. .............. 713/310 |
| 6,223,284 B1 * | 4/2001 | Novoa et al. .................. 713/100 |
| 6,266,696 B1 * | 7/2001 | Cromer et al. ................ 709/224 |
| 6,463,542 B1 * | 10/2002 | Yu et al. ........................ 713/320 |
| 7,356,047 B1 * | 4/2008 | Mahalawat et al. ........... 370/469 |
| 2002/0157030 A1 * | 10/2002 | Barker et al. .................. 713/320 |
| 2003/0126486 A1 * | 7/2003 | Bui ................................ 713/320 |
| 2003/0179709 A1 * | 9/2003 | Huff .............................. 370/248 |
| 2003/0206564 A1 * | 11/2003 | Mills et al. .................... 370/528 |
| 2004/0028074 A1 * | 2/2004 | Huff et al. ..................... 370/463 |
| 2004/0151149 A1 * | 8/2004 | Song et al. .................... 370/338 |
| 2005/0025067 A1 * | 2/2005 | Jones et al. .................... 370/254 |
| 2005/0097378 A1 * | 5/2005 | Hwang ......................... 713/320 |
| 2006/0282690 A1 * | 12/2006 | Cromer et al. ................ 713/300 |
| 2007/0106920 A1 * | 5/2007 | Lee et al. ...................... 713/320 |

OTHER PUBLICATIONS

Advanced Micro Devices; "Magic Packet Technology"; White Paper; Publication# 20213; Rev: A; Amendment/0; Issue Date: Nov. 1995; 6 pages.

IEEE Std 802.3™-2002 (Revision of IEEE Std 802.3, 2000 Edition); IEEE Standard for Information technology—Telecommunications and information exchange between systems—Local and metropolitan area networks—Specific requirements; Part 3: Carrier sense multiple access with collision detection (CSMA/CD) access method and physical layer specifications; Section One—pp. 1-576; Section Two—pp. 1-582; Section Three—pp. 1-379; IEEE Computer Society; Sponsored by the LAN/MAN Standards Committee; Mar. 8, 2002.

* cited by examiner

*Primary Examiner* — Alpus H Hsu
*Assistant Examiner* — Jeremy Costin

(57) ABSTRACT

Apparatus having corresponding methods comprise: a physical-layer input circuit to receive first signals representing first data; a first serializer to transmit a serial stream of the first data; and a magic packet circuit to generate a magic packet signal when the first data includes a magic packet.

22 Claims, 2 Drawing Sheets

PHYSICAL-LAYER DEVICE (PHY) HAVING A SERIAL INTERFACE AND A MAGIC PACKET CIRCUIT

CROSS-REFERENCE TO RELATED APPLICATIONS

This application claims the benefit of U.S. Provisional Patent Application Ser. No. 60/886,386, filed on Jan. 24, 2007, which is incorporated by reference herein in its entirety.

BACKGROUND

The present invention relates generally to data communications. More particularly, the present invention relates to a physical-layer device (PHY) having a serial interface and a magic packet circuit.

To conserve energy, many personal computers (PC) currently employ sleep modes that cause the PC to power off when not in use, for example at night or after a period of inactivity. However, these periods of inactivity are the ideal time for system administrators to perform software updates, hard drive backups, and the like.

Conventional magic packet technology permits a PC to be awoken from sleep mode remotely. According to this technology, the PC places an Ethernet controller in magic packet mode before the PC enters sleep mode. While in magic packet mode, the Ethernet controller, which includes a media access controller (MAC) and a PHY, remains awake while the PC sleeps, transmits no packets, and essentially ignores all incoming packets except magic packets, which are packets that include a particular predetermined pattern. Upon receiving a magic packet, the MAC wakes the PC (e.g., powers on the PC).

In systems where the Ethernet PHY and MAC are implemented or integrated on separate chips, the PHY and MAC are traditionally connected via a Gigabit Media Independent Interface (GMII), Reduced GMII (RGMII), or Serial GMII (SGMII) interface. The GMII and RGMII interfaces do not consume much power when there is no traffic, but require many more pins than the SGMII interface. The SGMII interface has the advantage of fewer pins, but consumes the same amount of power regardless of the operating speed of the PHY or the presence or absence of traffic.

Of course, it is desirable for the Ethernet controller to minimize power consumption while in magic packet mode. However, as mentioned above, an SGMII interface consumes the same amount of power despite the near absence of traffic in magic packet mode. In addition, the SGMII interface must remain active during magic packet mode in order to pass magic packets from the PHY to the MAC, where the magic packet circuit traditionally resides.

SUMMARY

In general, in one aspect, an embodiment features an apparatus comprising: a physical-layer input circuit to receive first signals representing first data; a first serializer to transmit a serial stream of the first data; and a magic packet circuit to generate a magic packet signal when the first data includes a magic packet.

Embodiments of the apparatus can include one or more of the following features. Some embodiments comprise a first Serial Gigabit Media Independent Interface (SGMII) comprising the first serializer, and a first deserializer to receive a serial stream of second data; a physical-layer output circuit to transmit second signals representing the second data; and a first power control circuit to power off the first SGMII interface based on a magic packet mode signal, and to power on the first SGMII interface based on the magic packet signal. Some embodiments comprise a physical-layer device comprising the apparatus. In some embodiments, the physical-layer device is compliant with all or part of IEEE standard 802.3, including draft and approved amendments. Some embodiments comprise an integrated circuit comprising the physical-layer device. Some embodiments comprise a network device comprising: the physical-layer device; and a media access controller comprising a second SGMII interface to receive the serial stream of the first data, and to transmit the serial stream of the second data, and a second power control circuit to power off the second SGMII interface based on the magic packet mode signal, and to power on the second SGMII interface based on the magic packet signal. In some embodiments, the second power control circuit powers off the media access controller based on the magic packet mode signal, and powers on the media access controller based on the magic packet signal. In some embodiments, the network device is selected from the group consisting of a network switch; a router; and a network interface controller. Some embodiments comprise a personal computer comprising the network device.

In general, in one aspect, an embodiment features a method comprising: receiving, into a physical-layer device, signals representing first data; transmitting, from the physical-layer device, a serial stream of the first data; and generating, in the physical-layer device, a magic packet signal when the first data includes a magic packet.

Embodiments of the method can include one or more of the following features. In some embodiments, the physical-layer device comprises a first Serial Gigabit Media Independent Interface (SGMII) to transmit the serial stream of the first data and to receive a serial stream of second data; and wherein the method further comprises powering off the first SGMII interface based on a magic packet mode signal, and powering on the first SGMII interface based on the magic packet signal. In some embodiments, the physical-layer device is compliant with all or part of IEEE standard 802.3, including draft and approved amendments. Some embodiments comprise powering off a second SGMII interface in a media access controller based on the magic packet mode signal, wherein the second SGMII interface receives the serial stream of the first data and transmits the serial stream of the second data; and powering on the second SGMII interface based on the magic packet signal. Some embodiments comprise powering off the media access controller based on the magic packet mode signal; and powering on the media access controller based on the magic packet signal.

In general, in one aspect, an embodiment features an apparatus comprising: physical-layer input means for receiving first signals representing first data; first serializer means for transmitting a serial stream of the first data; and magic packet means for generating a magic packet signal when the first data includes a magic packet.

Embodiments of the apparatus can include one or more of the following features. Some embodiments comprise first Serial Gigabit Media Independent Interface (SGMII) means for interfacing comprising the first serializer means, and first deserializer means for receiving a serial stream of second data; physical-layer output means for transmitting second signals representing the second data; and first power control means for powering off the first SGMII means based on a magic packet mode signal, and for powering on the first SGMII means based on the magic packet signal. Some embodiments comprise a physical-layer device comprising the apparatus. In some embodiments, the physical-layer device is compliant with all or part of IEEE standard 802.3, including draft and approved amendments. Some embodiments comprise an integrated circuit comprising the physical-layer device. Some embodiments comprise a network device comprising: the physical-layer device; and a media access controller comprising second SGMII means for receiving the serial stream of the first data, and for transmitting the serial stream of the second data, and second power control means for powering off the second SGMII means based on the magic packet mode signal, and for powering on the second SGMII means based on the magic packet signal.

The details of one or more implementations are set forth in the accompanying drawings and the description below. Other features will be apparent from the description and drawings, and from the claims.

Figure 1:
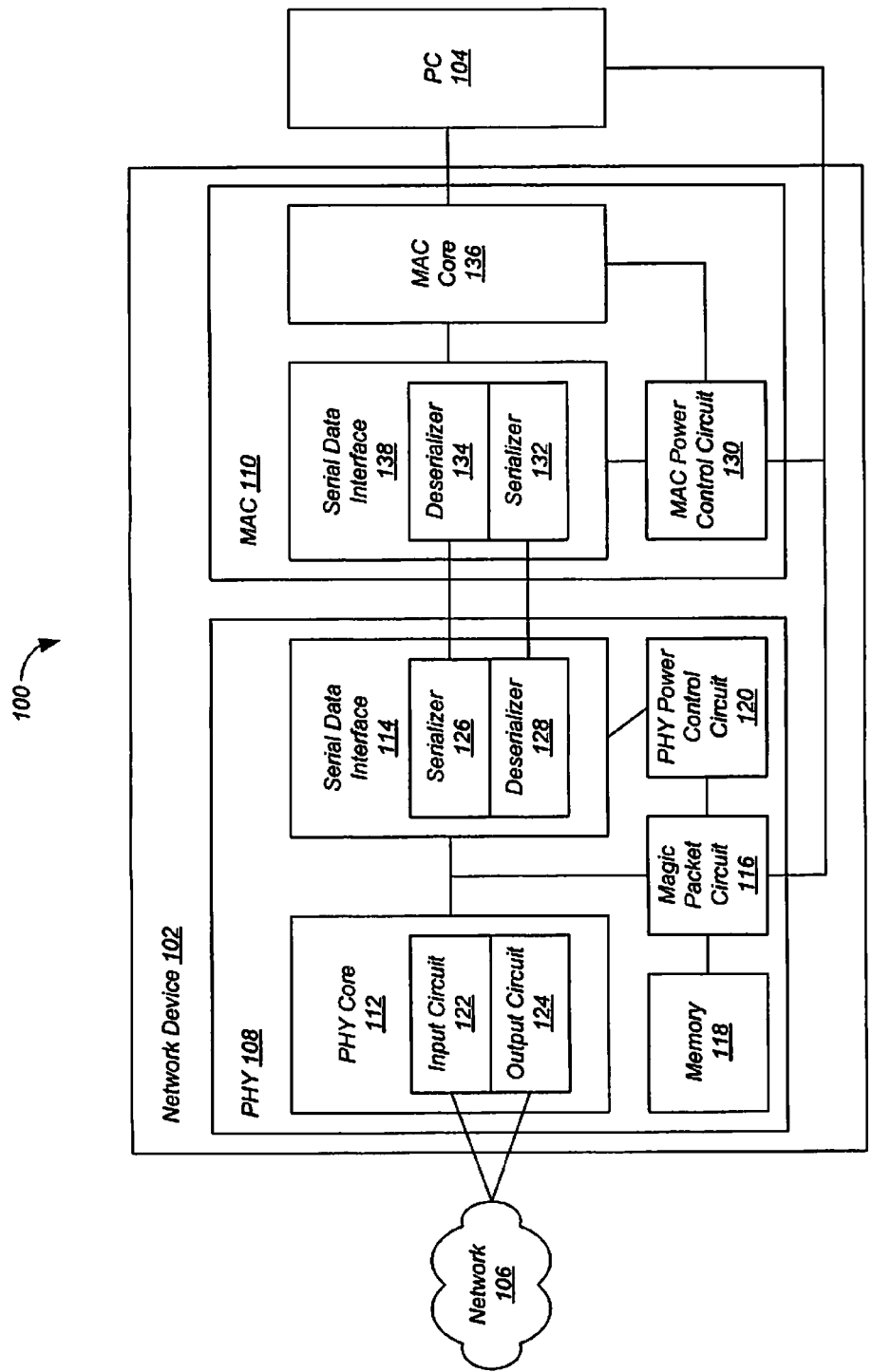
FIG. 1 shows a data communication system comprising a network device in communication with an Ethernet network and a personal computer (PC) according to some embodiments of the present invention.

The leading digit(s) of each reference numeral used in this specification indicates the number of the drawing in which the reference numeral first appears.

DETAILED DESCRIPTION

Embodiments of the present invention provide physical-layer devices (PHY) having a magic packet circuit and a serial interface such as a Serial Gigabit Media Independent Interface (SGMII). Because the magic packet circuit resides in the PHY, the serial interface can be powered off while in magic packet mode because the magic packets need not be passed to the MAC. According to these embodiments, the MAC can be powered off as well, further conserving power. Embodiments of the present invention are especially useful with serial interfaces such as SGMII that continue to consume power even when little or no traffic is present.

FIG. 1 shows a data communication system 100 comprising a network device 102 in communication with a network 106 and a personal computer (PC) 104 according to some embodiments of the present invention. Network device 102 can be compliant with all or part of IEEE standard 802.3, including draft and approved amendments. In other embodiments, other sorts of network devices can replace network device 102, such as routers, switches, and the like, and the network 106 can be an Ethernet network or other type of network.

Although in the described embodiments, the elements of data communication system 100 are presented in a particular arrangement, other embodiments may feature other arrangements. For example, the elements of data communication system 100 can be implemented in hardware, software, or combinations thereof. As another example, network device 102 can be implemented as part of PC 104, for example on a motherboard of PC 104.

Network device 102 includes a PHY 108 and a MAC 110, which can be implemented as separate integrated circuits, that communicate over a serial interface such as SGMII. PHY 108 includes a PHY core 112, a serial data interface 114 in communication with PHY core 112 and MAC 110, a magic packet circuit 116, a memory 118, and a PHY power control circuit 120. PHY core 112 includes an input circuit 122 and an output circuit 124 in communication with network 106. Serial data interface 114 includes a serializer 126 and a deserializer 128. In one implementation, PHY core 112, serial data interface 114, magic packet circuit 116, memory 118, and PHY power control circuit 120 are integrated onto a same chip.

MAC 110 includes a MAC core 136, a serial data interface 138, and a MAC power control circuit 130. Serial data interface 138 includes a serializer 132 in communication with deserializer 128 of PHY 108, and a deserializer 134 in communication with serializer 126 of PHY 108. In one implementation, MAC core 136, serial data interface 138, and MAC power control circuit 130 are integrated onto a same chip.

Figure 2:
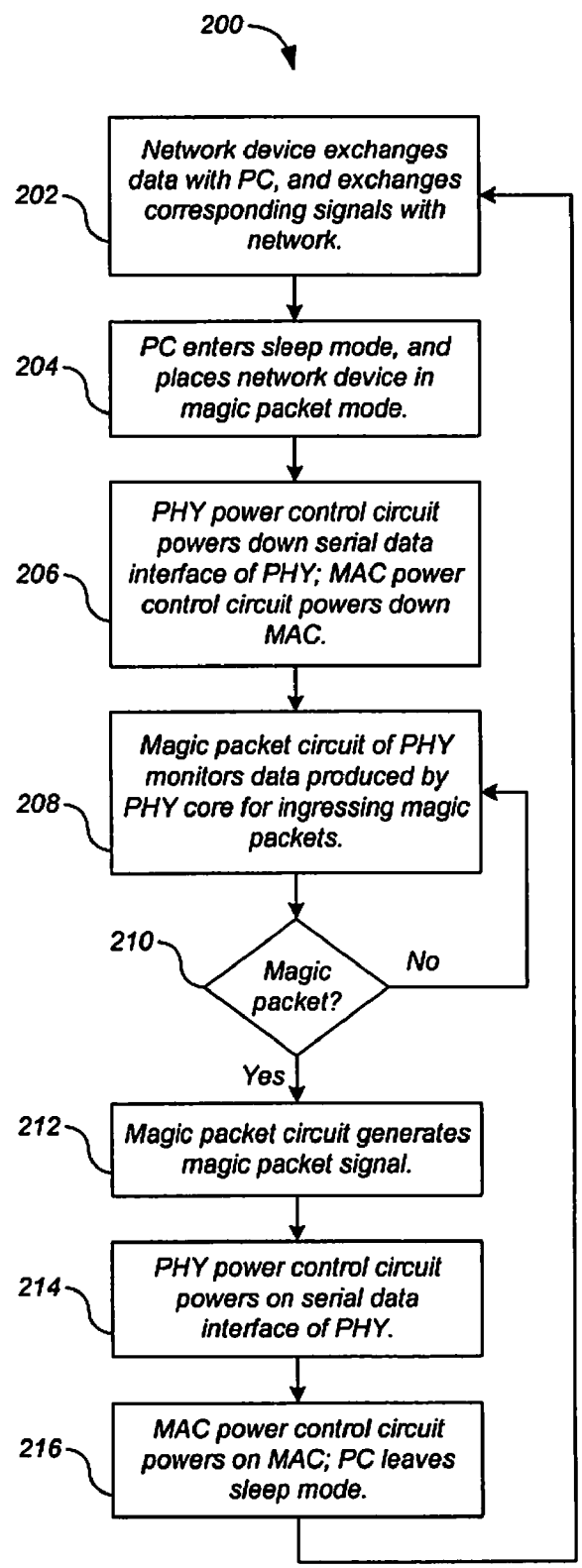
FIG. 2 shows a process for the data communication system of FIG. 1 according to some embodiments of the present invention.

FIG. 2 shows a process 200 for data communication system 100 of FIG. 1 according to some embodiments of the present invention. Although in the described embodiments, the steps of process 200 are presented in a particular order, the steps of process 200 may be performed differently. For example, in various embodiments, some or all of the steps of process 200 can be executed in a different order, concurrently, and the like.

Referring to FIG. 2, when not in magic packet mode, network device 102 exchanges data with PC 104, and exchanges corresponding signals with network 106 (step 202). On the ingress side, input circuit 122 of PHY 108 receives physical-layer signals representing data, and serializer 126 transmits a serial stream of the data to MAC 110, which passes the data to PC 104. On the egress side, PC 104 passes data to MAC 110, which transmits a serial stream of data to deserializer 128, and output circuit 124 transmits physical-layer signals representing the data to network 106.

When entering sleep mode, PC 104 places network device 102 in magic packet mode (step 204). For example, PC 104 asserts a magic packet mode signal, which can be conveyed to PHY 108 in any number of ways. For example, a management interface such as Management Data Input/Output (MDIO) can be used to set a bit in memory 118, which can be monitored by PHY power control circuit 120. As another example, a dedicated pin of an integrated circuit comprising PHY 108 can be used.

In response to the magic packet mode signal, PHY power control circuit 120 powers off serial data interface 114 of PHY 108 (step 206). In some embodiments, MAC power control circuit 130 powers off serial data interface 138 of MAC 110, and can power off MAC core 136, in response to the magic packet mode signal.

While in magic packet mode, magic packet circuit 116 of PHY 108 monitors the data produced by PHY core 112 for ingressing magic packets (step 208). In some embodiments, memory 118 stores a magic packet pattern that magic packet circuit 116 compares to the data produced by PHY core 112. The magic packet pattern can include the MAC address of MAC 110 so that magic packets addressed to other network devices do not match. Magic packet circuit 116 can also process the preamble, start-of-frame delimiter (SFD), and cyclic redundancy check (CRC) fields of ingressing packets.

When magic packet circuit 116 detects a magic packet (step 210), magic packet circuit 116 generates a magic packet signal (step 212). In response to the magic packet signal, PHY power control circuit 120 powers on serial data interface 114 of PHY 108 (step 214). In embodiments where the magic packet pattern includes a destination MAC address, magic packet circuit 116 generates the magic packet signal only when the destination MAC address in the magic packet pattern matches the MAC address of MAC 110.

The magic packet signal can also be communicated to MAC 110, and to PC 104. In response to the magic packet signal, MAC power control circuit 130 powers on serial data interface 138 of MAC 110, and can power on MAC core 136 as well (step 216). PC 104 awakens from sleep mode in response to the magic packet signal. Process 200 can then resume at step 202.

In some embodiments, the magic packet signal can take the form of an interrupt signal asserted on a pin of an integrated circuit comprising PHY 108. Memory 118 can store an interrupt mask bit, programmable over a management interface, to enable and disable assertion of the interrupt signal. In some embodiments, MAC 110 interrogates PHY 108 after receiving the magic packet signal, to ensure that PHY 108 has received a magic packet, before elements of MAC 110, and PC 104, are powered on. In other embodiments, the magic packet signal can take the form of a bit in memory 118 which is polled by MAC 110, for example over a management interface.

Embodiments of the invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:

1. An apparatus comprising:
a media access controller comprising a media access core; and
a physical-layer device comprising
a physical-layer core with a physical-layer input circuit, wherein the physical-layer input circuit is configured to receive, from a network, first signals representing first data,
a first serializer configured to transmit a serial stream of the first data from the physical-layer input circuit to the media access controller, and
a magic packet circuit configured to generate a magic packet signal to transition, from being powered OFF to being powered ON, (i) the media access controller, and (ii) at least one interface between the physical-layer core of the PHY physical-layer device and the media access core,
wherein the magic packet circuit is configured to (i) determine whether the first data includes a magic packet by comparing a pattern of the first data with a predetermined pattern of the magic packet, (ii) generate the magic packet signal when the first data has the predetermined pattern, and (iii) ignore packets received by the physical-layer input circuit that do not include the magic packet to prevent generating the magic packet signal, wherein the predetermined pattern includes a destination media access controller address,
wherein the magic packet circuit is configured to generate the magic packet signal when (i) an address of the first data is the destination media access controller address, and (ii) the destination media access controller address is an address of the media access controller, and
wherein the media access controller is connected between the physical-layer device and a computer, and wherein packets of the first data are transmitted from the media access controller to the computer.

2. The apparatus of claim 1, wherein the at least one interface comprises a first Serial Gigabit Media Independent Interface (SGMII) of the physical-layer device, the first SGMII comprising:
the first serializer; and
a first deserializer configured to receive a serial stream of second data from the media access controller, and
wherein the apparatus further comprises
a physical-layer output circuit configured to transmit second signals representing the second data over the network, and
a first power control circuit configured to (i) power off the first SGMII based on a mode signal received from the computer, and (ii) power on the first SGMII based on the magic packet signal.

3. A network device comprising the apparatus of claim 2, wherein the media access controller comprises:
a second SGMII configured to (i) receive the serial stream of the first data, and (ii) transmit the serial stream of the second data, and
a second power control circuit configured to (i) power off the second SGMII based on the mode signal, and (ii) power on the second SGMII based on the magic packet signal.

4. The network device of claim 3, wherein the second power control circuit is configured to (i) power off the media access controller based on the mode signal, and (ii) power on the media access controller based on the magic packet signal.

5. The network device of claim 3, wherein the network device is selected from the group consisting of:
a network switch;
a router; and
a network interface controller.

6. The network device of claim 3, wherein the at least one interface comprises the second SGMII.

7. The apparatus of claim 2, wherein the mode signal is transmitted from the computer to the apparatus.

8. An integrated circuit comprising the apparatus of claim 1.

9. The apparatus of claim 1, wherein: the media access controller is configured to interrogate the physical-layer device subsequent to the physical-layer input circuit receiving the magic packet; and the media access controller interrogates the physical-layer device to ensure that the physical-layer device has received the magic packet prior to elements of the media access controller being powered on.

10. The apparatus of claim 9, wherein the media access controller polls the magic packet of the first data from memory of the physical-layer device during the interrogation of the physical-layer device.

11. A method comprising:
providing a physical-layer device that includes a physical-layer core with a physical-layer input circuit;
receiving from a network, into the physical-layer device, signals representing first data via the physical-layer input circuit;
transmitting, from the physical-layer device, a serial stream of the first data to a media access controller via a serializer;
determining whether the first data includes a magic packet by comparing a pattern of the first data with a predetermined pattern of the magic packet, wherein the predetermined pattern includes a destination media access controller address;
generating a magic packet signal in the physical-layer device to transition, from being powered OFF to being powered ON, (i) the media access controller, and (ii) at least one interface between the physical-layer core and a media access core in the media access controller, wherein the magic packet signal is generated when (i) the first data has the predetermined pattern, (ii) an address of the first data is the destination media access controller address, and (iii) the destination media access controller address is an address of the media access controller; and
ignoring packets received by the physical-layer input circuit that do not include the magic packet to prevent generating the magic packet signal, and
wherein the media access controller is connected between the physical-layer device and a computer, and wherein packets of the first data are transmitted from the media access controller to the computer.

12. The method of claim 11, wherein:
the at least one interface comprises a first Serial Gigabit Media Independent Interface (SGMII) of the physical-layer device;
the first SGMII to transmit the serial stream of the first data to the media access controller and to receive a serial stream of second data from the media access controller; and
the method further comprises
powering off the first SGMII based on a mode signal received from the computer, and
powering on the first SGMII based on the magic packet signal.

13. The method of claim 12, further comprising:
powering off a second SGMII in the media access controller based on the mode signal, wherein the second SGMII is configured to (i) receive the serial stream of the first data, and (ii) transmit the serial stream of the second data; and
powering on the second SGMII based on the magic packet signal.

14. The method of claim 13, further comprising:
powering off the media access controller based on the mode signal; and
powering on the media access controller based on the magic packet signal.

15. An apparatus comprising:
a media access controller comprising a media access core; and
a physical-layer device comprising
a physical-layer core with physical-layer input means for receiving first signals from a network, the first signals representing first data,
first serializer means for transmitting a serial stream of the first data from the physical-layer input means to the media access controller, and
magic packet means for generating a magic packet signal in the physical-layer input means to transition, from being powered OFF to being powered ON, (i) the media access controller, and (ii) at least one interface between the physical-layer core of the physical-layer input means and the media access core,
wherein the magic packet means (i) determines whether the first data includes a magic packet by comparing a pattern of the first data with a predetermined pattern of the magic packet, (ii) generates the magic packet signal when the first data includes has the predetermined pattern, and (iii) ignore packets received by the physical-layer input means that do not include the magic packet to prevent generating the magic packet signal, wherein the predetermined pattern includes a destination media access controller address, and
wherein the magic packet means is configured to generate the magic packet signal when (i) an address of the first data is the destination media access controller address, and (ii) the destination media access controller address is an address of the media access controller, and
wherein the media access controller is connected between the physical-layer device and a computer, and wherein packets of the first data are transmitted from the media access controller to the computer.

16. The apparatus of claim 15, wherein the at least one interface comprises first Serial Gigabit Media Independent Interface (SGMII) means for interfacing between the physical-layer device and the media access controller, the first SGMII means comprising:
the first serializer means; and
first deserializer means for receiving a serial stream of second data from the media access controller, and
wherein the apparatus further comprises
physical-layer output means for transmitting second signals representing the second data over the network, and
first power control means for powering off the first SGMII means based on a mode signal received from the computer, and for powering on the first SGMII means based on the magic packet signal.

17. An integrated circuit comprising the apparatus of claim 16.

18. A network device comprising the apparatus of claim 16, wherein the media access controller comprises:
second SGMII means for receiving the serial stream of the first data, and for transmitting the serial stream of the second data, and
second power control means for powering off the second SGMII means based on the mode signal, and for powering on the second SGMII means based on the magic packet signal.

19. A network device configured to operate in a magic packet mode, wherein in response to the network device operating in the magic packet mode, the network device is operable to wake a computer from a sleep mode in response to the network device receiving a magic packet, the network device comprising:

a physical-layer device, wherein the physical-layer device includes a physical-layer core configured to receive data from a network, wherein the data is received by the physical-layer core as ingressing packets from the network;

a first serial data interface configured to transmit a serial stream of the data to a media access controller; and the media access controller, wherein the media access controller is connected between the physical-layer device and the computer, wherein packets of the data are transmitted from the media access controller to the computer, and wherein the media access controller includes a second serial data interface configured to receive the serial stream of the data transmitted from the first serial data interface, wherein the physical-layer device further includes a first power control circuit configured to power off the first serial data interface in response to the network device operating in the magic packet mode; and a magic packet circuit configured to, while the network device is operating in the magic packet mode, monitor the ingressing packets received by the physical-layer core for the magic packet, wherein the magic packet circuit is configured to detect the magic packet within the ingressing packets by comparing a pattern within each of the ingressing packets to a predetermined magic packet pattern, wherein the predetermined magic packet pattern includes a destination address associated with the media access controller, wherein in response to the magic packet circuit detecting the magic packet within the ingressing packets, the first power control circuit is configured to power on the first serial data interface, and the magic packet circuit is configured to wake the computer from the sleep mode, and wherein the magic packet circuit is configured to wake the computer from the sleep mode by (i) generating a magic packet signal, and (ii) sending the magic packet signal to the computer.

20. The network device of claim 19, wherein:

the media access controller further includes a second power control circuit configured to power off the second serial data interface in response to the network device operating in the magic packet mode; and the second power control circuit is configured to power on the second serial data interface in response to the magic packet circuit detecting the magic packet within the ingressing packets.

21. The network device of claim 19, wherein the network device is configured to operate in the magic packet mode in response to the computer entering the sleep mode.

22. The network device of claim 19, wherein each of the first serial data interface and the second serial data interface comprises a Serial Gigabit Media Independent Interface (SGMII).

\* \* \* \* \*

UNITED STATES PATENT AND TRADEMARK OFFICE
CERTIFICATE OF CORRECTION

| | | |
|---|---|---|
| PATENT NO. | : 8,345,673 B1 | Page 1 of 1 |
| APPLICATION NO. | : 11/971612 | |
| DATED | : January 1, 2013 | |
| INVENTOR(S) | : William Lo et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 471 days.

Signed and Sealed this
Twenty-eighth Day of October, 2014

Michelle K. Lee
*Deputy Director of the United States Patent and Trademark Office*